Aug. 5, 1969 C. B. BRAHM 3,459,966

LEAKAGE CURRENT ELIMINATION

Filed May 27, 1964

INVENTOR.
CHARLES B. BRAHM

BY Shenier & O'Connor

ATTORNEYS

United States Patent Office 3,459,966

Patented Aug. 5, 1969

3,459,966
LEAKAGE CURRENT ELIMINATION

Charles B. Brahm, Ellington, Conn., assignor to United Aircraft Corporation, East Hartford, Conn., a corporation of Delaware Filed May 27, 1964, Ser. No. 370,550
Int. Cl. H03k 17/16
U.S. Cl. 307—239 11 Claims My invention relates to transistor switching circuits and more particularly to the elimination of leakage currents in such cicuits.

In transistor switching circuits of the prior art, where it is desired to gate voltages and currents, two problems exist. Firstly, when transistors are rendered conductive and thus turned "on," their saturation resistances are not linear. Saturation resistances depend upon the amount of base drive current; and set-off voltages are present which depend not only upon temperature but also upon the base drive. Secondly, when transistors are rendered non-conductive and thus turned "off," a residual collector cut-off current flow remains which is dependent upon temperature.

One object of my invention is to provide a transistor switching circuit in which variations in voltage drop of a conductive transistor have no effect upon the current passing though a load.

Another object of my invention is to provide a transistor switching circuit in which the collector cut-off current of a non-conductive transistor has no effect upon the current passing through a load.

Other and further objects of my invention will appear from the following description:

In general my invention contemplates the provision of a pair of transistors which are selectively rendered conductive and non-conductive and are coupled to a load. In order to render the current though the load independent of changes in the saturation resistance of the transistors and of changes in resistance of load itself, the load current is coupled through an auxiliary resistor of high stability. The voltage drop across such auxiliary resistor is thus proportional to current through the load, and is used to control the voltage applied to the switching circuit. However, the current through the auxiliary resistor is subject not only to currents from the conductive transistor which pass through the load, but also to leakage currents fom the non-conductive transistor which bypass the load yet flow through the auxiliary measuring resistor. I prevent the bypass leakage currents from passing through the auxiliary measuring resistor by employing an auxiliary diode having an extremely high back resistance which is placed in series with each transistor and so polarized as to permit the flow of current fom a conductive transistor through the load. When a transistor is rendered non-conductive I reverse bias its association diode so that the leakage current of a non-conductive transistor bypasses the auxiliary measuring resistor. The reverse bias on the diode prevents load current from bypassing the current measuring resistor.

In the accompanying drawings which form part of the instant specification and are to be read in conjunction therewith and in which like reference numerals are used to indicate like parts in the various views.

Figures 1, 2:
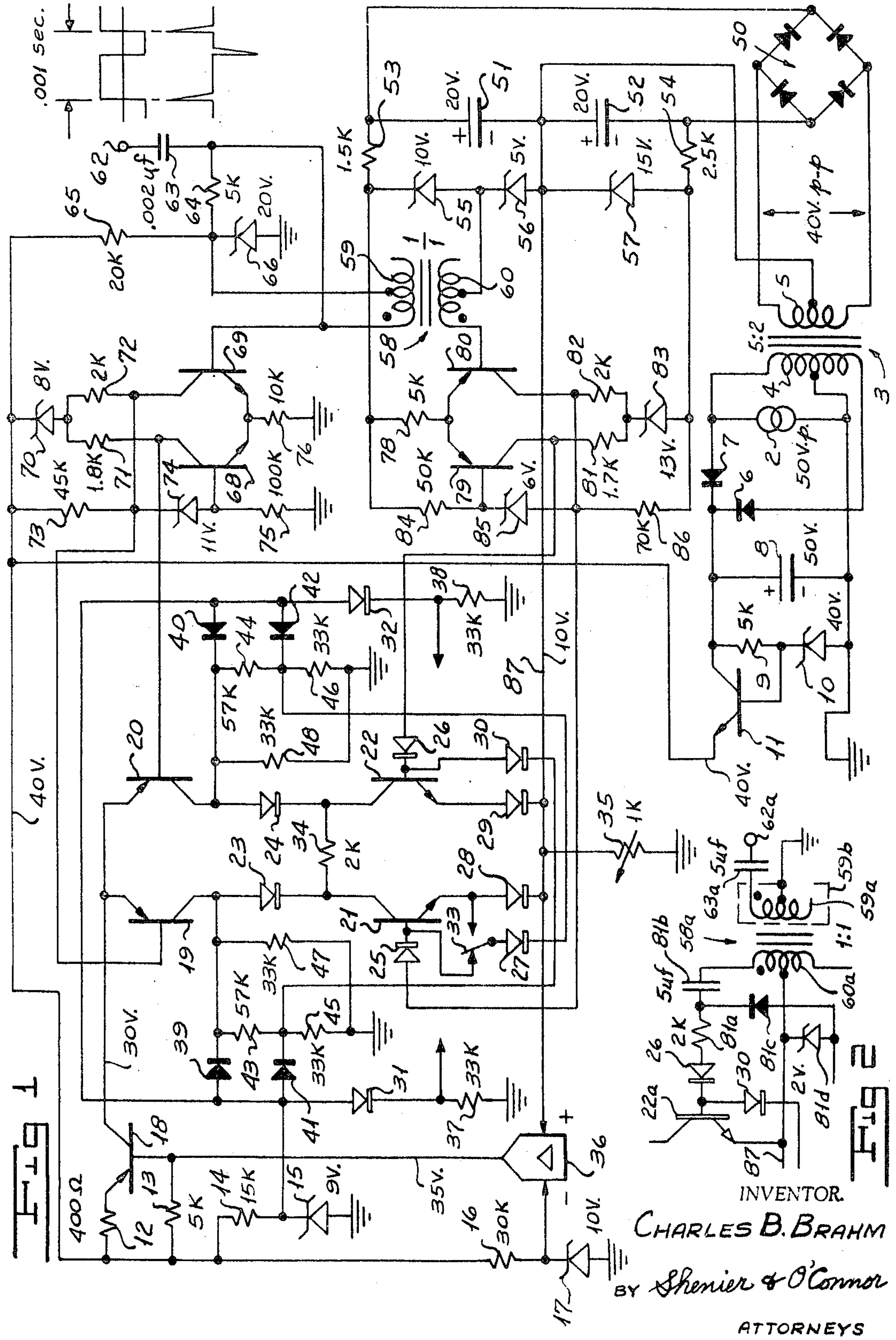
FIGURE 1 is a schematic view showing one embodiment of my invention.
FIGURE 2 is a fragmentary view showing another embodiment of my invention.

More particularly referring now to FIGURE 1, a source 2 of alternating current of a convenient fequency such as 400 cycles per second and providing a peak output of 50 volts has one terminal connected to the grounded center tap of the primary winding 4 of a transformer indicated generally by the reference numeral 3. The other terminal of source 2 is coupled to the anode of a rectifier 7 and to one terminal of winding 4. The other terminal of winding 4 is connected to the anode of a rectifier 6. The output at the cathodes of rectifiers 6 and 7 is applied to the positive terminal of a 50 volt storage capacitor 8, the negative terminal of which is grounded. The positive terminal of capacitor 8 is serially coupled through a 5K resistor 9 and backwardly through a 40 volt Zener diode 10 to ground. The positive terminal of capacitor 8 is also connected to the collector of an n-p-n emitter follower transistor 11, the base of which is coupled to the junction of resistor 9 and Zener diode 10. The potential at the emitter of transistor 11 is substantially 40 volts, and is applied through a 400 ohm resistor 12 to the emitter of a p-n-p current regulating transistor 18, the collector output of which is nominally 30 volts. The collector of transistor 18 is coupled to the emitters of p-n-p gate transistors 19 and 20. The collectors of gate transistors 19 and 20 are coupled forwardly through respective diodes 23 and 24 to the respective collectors of n-p-n gate transistors 21 and 22. A 2K load resistor 34 is connected between the collectors of transistors 21 and 22; and the emitters of these transistors are connected forwardly through respective diodes 28 and 29 to a conductor 87 which is maintained at a potential of 10 volts. Conductor 87 is connected to ground through a zero temperature coefficient variable resistor 35 having a nominal value of 1K. The emitter of transistor 11 is serially connected through a 15K resistor 14 and backwardly through a 9 volt Zener diode 15 to ground and is also serially connected through a 30K resistor 16 and backwardly through a precision 10 volt reference Zener diode 17 to ground. The junction of resistor 16 and Zener diode 17 is connected to the negative input of a differential amplifier 36, the positive input of which is coupled to conductor 87. The output of differential amplifier 36 has a nominal potential of 35 volts and is applied to the base of current regulating transistor 18. Differential amplifier 36 is a high-gain, direct-current amplifier which should have an extremely high input impedance so that substantially no current is drawn from conductor 87. Differential amplifier 36 may have a plurality of amplifying stages, the last stage of which provides a collector output across a 5K resistor 13 which is coupled to the 40 volt supply appearing at the emitter of transistor 11. The output polarity of amplifier 36 is such that if conductor 87 rises in potential then the potential applied to the base of transistor 18 likewise increases. The junction of resistor 14 and Zener diode 15 is coupled to the anodes of rectifiers 39, 40, 41, and 42 and to the anodes of diodes 31 and 32. The cathode of rectifier 39 is connected to the collector of transistor 19, to ground through a 33K resistor 47, and to the cathode of diode 41 through a 57K resistor 43. The cathode of rectifier 41 is connected to ground through a 33K resistor 45 and is also coupled backwardly through a diode 30 to the base of transistor 22. The cathode of rectifier 40 is connected to the collector of transistor 20, to ground through a 33K resistor 48, and to the cathode of rectifier 42 through a 57K resistor 44. The cathode of rectifier 42 is connected to ground through a 33K resistor 48 and is also coupled backwardly through a diode 27 to the armature of a single-pole, double-throw switch 33. Armature 33 preferably, as in the position shown, engages one contact which is connected to the base of transistor 21, but may be moved into engagement with a contact connected to the emitter of transistor 21. The cathodes of diodes 31 and 32 are connected to ground through respective 33K resistors 37 and 38. Transformer 3 provides a step-down ratio of five-to-two. Across its secondary winding 5 thus appears 40 volts peak-to-peak which is applied to the input of a four rectifier, full-wave bridge, indicated generally by the reference numeral 50. The positive output of bridge 50 is applied to the positive terminal of a 20 volt storage capacitor 51. The negative output of bridge 50 is applied to the negative terminal of a 20 volt storage capacitor 52. The negative terminal of capacitor 51 and the positive terminal of capacitor 52 are coupled to the center tap of secondary winding 5 and to conductor 87. The positive terminal of capacitor 51 is connected serially through a 1.5K resistor 53 and backwardly through a 10 volt Zener diode 55 and a 5 volt Zener diode 56 to conductor 87. The negative terminal of capacitor 52 is serially connected through a 2.5K resistor 54 and forwardly through a 15 volt Zener diode 57 to conductor 87. The cathode of Zener diode 55 is coupled through a 5K resistor 78 to the emitter p-n-p transistors 79 and 80. The collectors of transistors 79 and 80 are connected through respective 1.7K and 2K resistors 81 and 82 to the cathode of a 13 volt Zener diode 83, the anode of which is coupled to the anode of Zener diode 57. The cathode of Zener diode 55 is serially connected through a 50K resistor 84, backwardly through a 6 volt Zener diode 85, and through a 70K resistor 86 to the anode of Zener diode 57. The junction of resistor 84 and Zener diode 85 is coupled to the base of transistor 79. The junction of Zener diodes 55 and 56 is connected to the center tap of the secondary winding 60 of an isolation pulse transformer indicated generally by the reference numeral 58. The positive polarity terminal of winding 60 is applied to the base of transistor 80. The collector of transistor 79 is connected forwardly through a diode 26 to the base of a transistor 22. The collector of transistor 80 is connected to the junction of resistor 86 and Zener diode 85, and is also connected forwardly through a diode 25 to the base of transistor 21. The 40 volt supply at the emitter of transistor 11 is serially connected through a 45K resistor 73, backwardly through an 11 volt Zener diode 74, and through a 100K resistor 75 to ground, is connected to the cathode of an 8 volt Zener diode 70, and is serially connected through a 20K resistor 65 and backwardly through a 20 volt Zener diode 66 to ground. At an input terminal 62 is applied a square wave input of variable mark-space ratio having a frequency, for example, of 1 kilocycle and a period of .001 second. The square wave input at terminal 62 may have an amplitude of 1 volt and is applied to a differentiating circuit comprising a .002 $\mu$f. capacitor 63 connected in series with a 5K resistor 64 to the junction of the Zener diode 66 and resistor 65. The output of the differentiating circuit across resistor 64 consists of alternate positive and negative pulses having a peak amplitude of 2 volts. The time-constant of the differentiating circuit is 10 microseconds which is only one-hundredth of the period of the square wave input. The junction of capacitor 63 and resistor 64 is applied to the positive polarity terminal of the primary winding 59 of transformer 58 and to the base of transistor 69. Primary winding 59 is provided with a center tap which is coupled to the cathode of Zener diode 66. Transformer 58 may have a one-to-one turns ratio. The anode of Zener diode 70 is connected through respective 1.8K and 2K resistors 71 and 72 to the collectors of n-p-n transistors 68 and 69, the emitters of which are connected through a common 10K resistor 76 to ground. The junction of Zener diode 74 and resistor 75 is coupled to the base of transistor 68. The collector of transistor 68 is connected to the base of transistor 20. The collector of transistor 69 is connected to the junction of Zener diode 74 and resistor 73, and is also applied to the base of transistor 19.

Diodes 23 through 32 are silicon planar diodes which have extremely low reverse currents. For example, at a reverse voltage of .01 volt the reverse current may be $10^{-10}$ ampere; at 0.1 volt, $1.8\times10^{-10}$ ampere; at 1 volt, $3.2\times10^{-10}$ ampere, and at a reverse voltage of 10 volts the reverse current may be $5.6\times10^{-10}$ ampere. Thus, for such diodes the reverse current increases by a factor of approximately 1.8 for each factor of ten increase in reverse voltage. Obviously, the smallest reverse currents are obtained with low reverse voltages. However, it is desired not only that the reverse current be small but also that the reverse current be constant. Thus, I may reverse bias the diodes by a voltage which is approximately ten times the uncertainty of reverse bias. For example, if the uncertainity of reverse bias is .01 volt, then I may provide a reverse bias of 0.1 volt; and if the uncertainity of reverse bias is 1 volt, then I may provide a reverse bias of 10 volts. I have assumed that the uncertainity of reverse bias due to temperature changes and drift in the characteristics of the transistors is approximately 0.1 volt and have accordingly shown a nominal reverse bias of 1 volt.

In operation of my circuit, assume the square wave input at terminal 62 changes from negative to positive, thus producing a momentary 2 volt positive-going pulse across differentiating resistor 64 which is directly coupled to transistor 69 and which is coupled through isolation transformer 58 to transistor 80. As will be explained in more detail subsequently, transistors 68 and 69 and also transistors 79 and 80 form a pair of bi-stable flip-flops which change state upon the application of mereely a 1 volt input. The positive-going signal applied to the base of transistor 69 renders it conductive and causes transistor 68 to be cut off; and at the same time transistor 80 is rendered non-conductive and transistor 79 conductive. The collector current of transistor 69 causes a base current flow in transistor 19, thus rendering it conductive. The collector current of transistor 79 passes through diode 26 to the base of gate transistor 22 rendering it conductive. With transistor 68 non-conductive, gate transistor 20 is rendered non-conductive; and with transistor 80 non-conductive, gate transistor 21 is rendered non-conductive.

The collector current of current control transistor 18 thus flows through transistor 19, diode 23, load resistor 24, transistor 22, and diode 29 to the current measuring resistor 35. With a value for resistor 35 of 1K and with a 10 volt bias provided by Zener diode 17, the load current will be maintained at 10 ma., since differential amplifier 36 will provide whatever small change in the nominal 35 volt potential at the base of transistor 18 which is required to produce this current. Load 34 will sustain 20 volts, so that, neglecting any voltage loss in gate transistors 19 and 20 and diodes 23 and 29, the potential of the collector of transistor 18 will be 30 volts. With transistor 20 non-conductive, resistor 48 causes its collector to drop to 9 volts where it is clamped by the forward current which then flows through rectifier 40. Assuming the voltage drops across conductive gate transistor 22 and diode 29 are negligible, then the cathode of diode 24 is substantially at the 10 volt potential of conductor 87. Since the anode of diode 24 is, however, at a potential of 9 volts, the diode is reverse biased by 1 volt. The cut-off collector current of transistor 20 flows to ground through resistor 48. Also, with gate transistor 20 non-conductive, the cathode of diode 27 is clamped to 9 volts by virtue of the forward current through rectifier 42 which flows through resistor 46. The cut-off collector current of gate transistor 21 thus flows through its base and thence through switch 33 and diode 27 to ground through resistor 46. The low back resistance of the emitter-base junction of transistor 21 compared with the high back resistance of diode 28 results in an emitter potential of transistor 21 which is substantially equal to its 9 volt base potential. Thus, the anode of diode 28 is at a potential of substantially 9 volts, while its cathode is at the 10 volt potential of conductor 87, thereby backwardly biasing diode 28 by substantially 1 volt. The cathode of diode 25 is at a potential of 9 volts; and, as will be subsequently described, its anode is at 8 volts. Hence diode 25 is likewise biased by 1 volt. With gate transistor 19 conductive so that its collector is at a potential of substantially 30 volts, rectifiers 39 and 41 are backwardly biased. The output of the voltage divider comprising resistors 43 and 45 at the junction thereof is 11 volts. Since the base of transistor 22 and hence the anode of diode 30 are at substantially the 10 volt potential of conductor 87, diode 30 is backwardly biased by 1 volt. It will be seen then that with gate transistors 19 and 22 conductive and with gate transistors 20 and 21 non-conductive, diodes 23, 26, 27, and 29 are forwardly biased while diodes 24, 25, 28, and 30 are backwardly biased by 1 volt. The cut-off collector currents of transistors 20 and 21 flow through respective resistors 48 and 46, and not through either load resistor 34 or current measuring resistor 35.

When the square wave input at terminal 62 changes from positive to negative, a negative-going 2 volt pulse appears across differentiating resistor 64, rendering trigger transistor 69 non-conductive and transistor 68 conductive and rendering trigger transistor 80 conductive and transistor 79 non-conductive. Thus, gate transistors 20 and 21 are rendered conductive while gate transistors 19 and 22 are rendered non-conductive. Now current flows from the collector of regulating transistor 18 through transistor 20, diode 24, load 34, transistor 21 and diode 28 to the current measuring resistor 35. If the net forward resistance of transistors 21 and 22 and diodes 24 and 28 is slightly different from that of transistors 19 and 22 and diodes 23 and 29, then a small change in the nominal 30 volt potential of the collector of transistor 18 will occur, since transistor 18 operates as a controlled constant-current source. With transistor 19 non-conductive, its collector is clamped to 9 volts by virtue of the forward current which now flows through rectifier 39 to resistor 47. With transistor 21 conductive, its collector and hence the cathode of diode 23 are substantially at 10 volts. Thus, diode 23 is backwardly biased by 1 volt. The cut-off collector current of transistor 19 flows to ground through resistor 47. Also, the cathode of diode 30 is clamped to 9 volts by virtue of the forward current through rectifier 41 to resistor 45. The cut-off collector current of transistor 22 flows through the base thereof and thence forwardly through diode 30 to ground through resistor 45. Again, the relatively low back resistance of the emitter-base junction of transistor 22 compared with the high back resistance of diode 29 causes the emitter of transistor 22 to be at a potential of 9 volts. Accordingly, diode 29 is backwarlly biased by 1 volt. As will be presently explained, the anode of diode 26 is maintained at a potential of 8 volts; and diode 26 is backwardly biased by 1 volt. With transistor 20 conductive, its collector potential is substantially 30 volts. Rectifiers 40 and 42 are backwardly biased. The output of the voltage divider comprising resistors 44 and 46 at the junction thereof is 11 volts; and diode 27 is backwardly biased by 1 volt. With transistors 20 and 21 conductive and transistors 19 and 22 non-conductive, diodes 24, 25, 28, and 30 are forwardly biased while a backward bias of 1 volt is maintained for diodes 23, 26, 27, and 29. The cut-off collector currents of transistors 19 and 22 flow through respective resistors 47 and 45, and not through either load resistor 34 or measuring resistor 35.

For transistors 19 and 20 the flow of base current bypasses both load resistor 34 and measuring resistor 35, so that no isolation is required in either the emitter or base circuits of these transistors. However, for transistors 21 and 22, isolation is desired in both the emitter and base circuits. It will be noted that the triggering circuit comprising transistors 79 and 80 which provides the base drive for gate transistors 21 and 22 is provided with an isolation power supply by transformer 3. Thus whatever current taken from the floating power supply which flows into the bases of the transistors 21 and 22, passes through the emitters thereof and then through conductor 87 back to the floating power supply. Thus the base drive for the transistors 21 and 22 does not pass through the measuring resistor 35. It will be appreciated that if the supply for the base drive for the transistors 21 and 22 were not isolated from ground then the current through measuring resistor 35 would be greater than that flowing through load 34 by the amount of base current flow of the transistors 21 and 22; and in order to regulate the flow of current through load 34 it would then be necessary accurately to regulate the base current flow through transistors 21 and 22.

Each of the windings of isolation transformers 3 and 58 are center-tapped with the center taps being connected to sources of fixed potential. This substantially eliminates the net effect of capacitive coupling between primary and secondary windings. Preferably, however, these transformers are provided with grounded electrostatic shields interposed between primary and secondary windings to eliminate actual capacitive coupling therebetween.

With trigger transistor 69 conducting and trigger transistor 68 non-conductive the base of transistor 69 is at a potential of 20 volts which is also substantially the potential of its emitter. Accordingly, 2 ma. flows through the collector of transistor 69 and thence through the common emitter resistor 76. The collector potential of transmitter 69 decreases to 30 volts at which it is clamped by virtue of the base current flow of transistor 19. Since 1 ma. flows through collector resistor 72 the base current of transistor 19 is 1 ma. With the collector of transistor 69 and the cathode of Zener diode 74 at 30 volts, the anode of Zener liode 74 and hence the base of transistor 68 are at a potential of 19 volts. Since the emitters of transistors 68 and 69 are at a potential of 20 volts the base to emitter voltage of transistor 68 is negative by 1 volt; and the transistor is non-conductive. With transistor 68 non-conductive its collector, and hence the base of gate transistor 20, are at a potential of 32 volts so that transistor 20 is biased into non-conduction by 2 volts.

With transistor 68 conductive and transistor 69 non-conductive, the collector of transistor 69 is at a potential of 32 volts thus biasing gate transistor 19 into non-conduction by 2 volts. With the collector of transistor 69 at 32 volts the base and hence the emitter of transistor 68 are at a potential of 21 volts because of the 11 volt drop across Zener diode 74. With the base of transistor 69 at a potential of 20 volts and its emitter at a potential of 21 volts, the transistor is biased negatively by 1 volt. The current flow through the common emitter resistor 76 is 2.1 ma. which is the same as the collector current of transistor 68. The collector of transistor 68 is clamped at 30 volts by virtue of base current flow of transistor 20. The current flow through resistor 71 is 1.1 ma.; and hence the base current flow of transistor 20 is 1 ma.

With the trigger transistor 80 conducting and transistor 79 non-conductive, the base of transistor 80 is at a potential of 15 volts which is also the potential of its emitter. Accordingly 2 ma. flows through the common emitter resistor 78. The collector of transistor 80 is clamped at 10 volts by virtue of base current flow through transistor 21. Since 1 ma. flows through collector resistor 82 the base current of transistor 21 is 1 ma. With the collector of transistor 80 at 10 volts, the base of transistor 79 is at a potential of 16 volts by virtue of the 6 volt drop across Zener diode 85; and transistor 79 is biased into non-conduction by 1 volt. With transistor 79 non-conductive its collector is at a potential of 8 volts. Since the cathode of diode 26 is at a potential of 9 volts, this establishes the 1 volt reverse bias across diode 26, as previously described.

With transistor 79 conductive and transistor 80 non-conductive the collector of transistor 80 is at a potential of 8 volts which, as previously indicated, establishes a 1 volt reverse bias across diode 25. Because of the 6 volt drop across Zener diode 85 the base of transistor 79 is at a potential of 14 volts which is also the potential of the common emitters of transistors 79 and 80. Transistor 80 is biased into non-conduction by 1 volt; and the current flow through resistor 78 is 2.2 ma. The collector of transistor 79 is clamped to 10 volts by virtue of current flow to the base of transistor 22. Since the current through resistor 81 is 1.2 ma. the current flow to the base of transistor 22 is 1 ma.

Resistors 73 and 86 act as high-impedance, constant-current sources for supplying quiescent current through Zener diodes 74 and 85 so that substantially no D.C. loading is introduced by these coupling circuits upon the collectors of transistors 69 and 80 respectively.

The grounded emitter current gains of gate transistors 19 through 22 should be appreciably greater than 10 and preferably not less than 20 so that the transistors are driven to saturation by the base current of 1 ma., since the current through load resistors 34 is only 10 ma. Collector resistors 71 and 81 of the trigger circuits have been selected so that the base current flow through all gate transistors is substantially the same. This equalizes their saturation resistances and reduces voltage variations at the collector of transistor 18.

Assuming that transistors 18 has a grounded emitter current gain of 24, then the current flow through resistor 12 will be approximately 12.5 ma. comprising 10 ma. load current through resistor 34, approximately 1 ma. through those resistors 43 through 48 which are connected to the collector of the conductive transistor 19 or 20, 1 ma. base current for the conductive one of transistors 19 and 20, and 0.5 ma. through the base of transistor 18. Thus resistor 12 will sustain 5 volts.

Resistor 71 especially should be selected so that the base current flow of transistors 19 and 20 is precisely the same. This reduces the required frequency response of differential amplifier 36, since any difference in the base current flow of transistors 19 and 20 will require a corresponding variation in the collector current of transistor 18 to maintain constant the flow of current through load 34 and measuring resistor 35.

With switch 33 in the position shown the cut-off collector current of transistor 21 flows through the base thereof; and its emitter is substantially open-circuited. This provides the minimum collector current flow for transistor 21. Assume, however, that switch 33 is actuated so that the anode of diode 27 is connected to the emitter of transistor 21. With such alternate connection, the leakage collector current of transistor 21 flows through the emitter thereof and thence through diode 26 and resistor 46 to ground. Again diode 28 is backwardly biased by 1 volt. Assuming that the back resistance of the emitter-base junction of transistor 21 is small compared with the back resistance of diode 25, the base of transistor 21 will be at substantially the same potential as its emitter; and diode 25 is again backwardly biased by 1 volt. However, in the alternate position of switch 33, the base of transistor 21 is open-circuited. Accordingly the cut-off current flow will be appreciably greater and approximately equal to the product of the current gain of transistor 21 and the collector cut-off current flow in the position of switch 33 shown where the emitter is open-circuited. Thus, if in the position of switch 33 shown the cut-off collector current is 2 μa, then in the alternate position of switch 33, and assuming a current gain of 25 for transistor 21, the cut-off collector current will be approximately 50 μa. It will be noted that the current flow through resistor 46 when clamped to 9 volts by rectifier 42 is 300 μa. Thus the circuit still operates properly so long as the cut-off collector current does not exceed this value.

A further alternative for eliminating leakage currents in transistors 21 and 22 is to connect the junction of diode 31 and resistor 37 to the armature of switch 33 and to connect the junction of diode 32 and resistor 38 to the base of transistor 22. In such event, the following components may be eliminated: diodes 27 and 30, rectifiers 41 and 42, and resistors 43 through 46. With such alternate connections and with switch 33 in the position shown, when transistor 21 is non conductive its base is again clamped to 9 volts by virtue of the current flow through diode 31 which passes through resistor 37. Thus diodes 25 and 28 are again backwardly biased by 1 volt. Since the cut-off current of transistor 21 flows through the base and the emitter is open-circuited, the cut-off current will have, as before, the minimum value of 2 μa. When transistor 21 is rendered conductive, then the potential of its base will be substantially 10 volts; and diode 31 is backwardly biased by 1 volt. However, resistor 37, which provides the leakage current path to ground when transistor 21 is nonconductive, still remains connected in the base circuit. The current through diodes 25 and 26 supplied by the floating trigger circuit comprising transistors 79 and 80 should be increased to approximately 1.3 ma. The total emitter current of transistor 25 will again be 11 ma. Of this, 1.3 ma. flows through conductor 87 to the floating supply and from the floating supply through diode 25. Of this, 300 μa. flows through resistor 37 to ground and 1 ma. flows into the base of transistor 21 where the combination with the 10 ma. collector current thereof produces the 11 ma. emitter current. Accordingly only 9.7 ma. flows through measuring resistor 35. This requires that its resistance value be increased to 1.03K to maintain its 10 volt potential drop. Resistors 37 and 38 should both have zero temperature coefficients and must be precisely matched to identical resistance values so that their selective shunting effect upon measuring resistor 35 is the same. The difficulty is that any variation in either the base to emitter potential of transistors 21 and 22 or the forward drop across diodes 28 and 29 will result in slightly different voltages across resistors 37 and 38 when respective transistors 21 and 22 are rendered conductive. This will destroy the equality of shunt current flow through these resistors. Switch 33 may be actuated so that the junction of resistor 37 and diode 31 is instead connected to the emitter of transistor 21. For this connection the base drive current through diodes 25 and 26 from the floating trigger circuit comprising transistors 79 and 80 may be restored to the original value of 1 ma. With transistor 21 non-conductive the collector leakage current of transistor 21 flows through the emitter thereof and the base is open-circuited. Accordingly the collector leakage current is increased from 2 μa. to 50 μa. When transistor 21 is rendered conductive the potential across resistor 37 increases to 10 volts and diode 31 is backwardly biased. Diodes 31 and 32 are provided to eliminate flow of load current to the Zener clamping source 15. Again, of the 10 ma. through load 35, 300 μa. passes through resistor 37 and only 9.7 ma. flows through current measuring resistor 35, which should again have a value of 1.03K. Again resistors 37 and 38 must have identical resistance values. Unequal voltage drops across transistors 21 and 22 will not disturb the equality of current flow through resistors 37 and 38. However, diodes 28 and 29 may have unequal voltage drops which would cause unequal voltages and hence unequal currents through resistors 37 and 38.

Accordingly the connections shown for transistor 22 are preferable and the following components may be eliminated: diodes 31 and 32, and resistors 37 and 38. Furthermore, switch 33 may be eliminated so that the anode of diode 27 is connected to the base of transistor 21.

Diodes 27 and 30 in conjunction with the change in voltage level at the cathodes of these diodes produced by voltage-dividing resistors 43 through 46 provides isolation in the base circuits when the transistors are conductive. Thus, no current bypasses measuring resistor 35 as occurred when resistors 37 and 38 were employed. When transistor 22 is non-conductive the 9 volt clamping potential at the cathode of diode 30 provides a path for the cut-off collector current of transistor 22. However, when transistor 22 is conductive, the 11 volt potential appearing at the cathode of diode 30 backwardly biases it by 1 volt so that the low impedance path provided for cut-off collector current is disabled when the transistor is rendered conductive.

It will be appreciated that the frequency response requirements of differential amplifier 36 due to minute variations in base current of transistors 19 and 20 may be entirely eliminated by providing for such transistors a floating base drive circuit similar to that shown for transistors 21 and 22.

Diodes 25 and 26 are provided to insure that no collector cut-off current flows into the floating supply, since such current would then pass through conductor 87 to measuring resistor 35. It will be appreciated that the floating base supply has no ground connection and hence can not bleed off and thus by-pass to ground the collector cut-off currents of transistors 21 and 22.

Referring now to FIGURE 2, I have shown an alternative embodiment of my invention in which diodes 28 and 29 are eliminated and in which the base current drive for transistors 21 and 22 is directly provided by transformer coupling without the use of an auxiliary floating power supply Transistor 22 is replaced by a silicon planar transistor 22*a*, the emitter of which is directly connected to conductor 87. An input terminal 62*a* is connected through a 5 $\mu$f. capacitor 63*a* to one terminal of the primary winding 59*a* of a one-to-one isolation transformer 58*a*. Primary winding 59*a* is provided with a grounded center tap. Interposed between the primary winding 59*a* and the secondary winding 60*a* is a grounded electrostatic shield 59*b*. Secondary winding 60*a* is provided with a center tap which is connected to conductor 87. One terminal of secondary winding 60*a* is connected serially through a 5 $\mu$f. capacitor 81*b*, a 2K resistor 81*a*, and forwardly through diode 26 to the base of silicon planar transistor 22*a*. Again the anode of diode 30 is connected to the base of transistor 22*a*. The junction of capacitor 81*b* and resistor 81*a* is connected backwardly through a rectifier 81*c* and forwardly through a 2 volt Zener diode 81*d* to conductor 87.

In operation of the circuit of FIGURE 2, the square wave voltage of variable mark-space ratio applied to terminal 62*a* should have an amplitude of 2 volts and accordingly a peak-to-peak amplitude of 4 volts. It is desired that, irrespective of the mark-space ratio of the square wave input at terminal 62*a*, the potential at the junction of resistor 81*a* and capacitor 81*b* should alternate between 12 volts and 8 volts, so that such potential is alternately 2 volts positive and 2 volts negative relative to conductor 87. It will be appreciated that where the mark-space ratio of the square wave input is other than unity, then the voltage appearing at the junction of resistor 81*a* and capacitor 81*b* contains a direct-current component. It will be further appreciated that such direct-current component could not be directly supplied to resistor 81*a* by transformer 58*a*, since transformers cannot transmit direct-current. Accordingly I have provided a direct-current restoration circuit comprising rectifier 81*c* and Zener diode 81*d* so that blocking condensers 63*a* and 81*b* may be provided for both the primary and secondary windings of transformer 58*a*. In order to reduce sag in the square wave voltage applied to resistor 81*a*, the primary circuit time-constant comprising capacitor 63*a* and the equivalent 2K resistance reflected into the primary winding and also the secondary circuit time-constant comprising capacitor 81*b* and resistor 81*a* are both .01 second, which is ten times the period of the square wave input.

When transistor 22*a* is rendered conductive, the voltage at the junction of resistor 81*a* and capacitor 81*b* is 2 volts positive relative to conductor 87 so that the base current flow through resistor 81*a* is 1 ma. This current flow tends to discharge capacitor 81*b* but produces negligible change in voltage because of the relatively long time-constant. As before, the potential applied to the cathode of diode 30 is 11 volts, backwardly biasing the diode by 1 volt. When the square wave input at terminal 62*a* becomes negative, the junction of resistor 81*a* and capacitor 81*b* would, in the absence of Zener diode 81*d*, drop to slightly less than 8 volts and hence slightly more than 2 volts negative relative to conductor 87, because of the slight discharge of capacitor 81*b* in supplying base current. However, the junction of resistor 81*a* and capacitor 81*b* is prevented from dropping below 8 volts by virtue of breakdown current flow through Zener diode 81*d* which passes through rectifier 81*c* to capacitor 81*b*, thus recharging it to its initial voltage. The cathode of diode 30 is again clamped to a potential of 9 volts so that the collector cut-off current of transistor 22*a* passes through the base thereof and thence through diode 30. The emitter-base junction of transistor 22*a* is backwardly biased by 1 volt. This emitter-base silicon planar junction has the same reverse current characteristic as the silicon planar diodes 23 through 32.

In the alternate embodiment of FIGURE 2, the emitter-base junction of transistor 22*a* is not merely open-circuited, but is instead affirmatively back-biased. The embodiment of FIGURE 2 is therefore to be preferred, not only because of the elimination of diodes 28 and 29, but also because the equilibrium clamping conditions are reached with substantially no time delay. In FIGURE 1 the equilibrium potential of the emitters of transistors 21 and 22 when rendered non-conductive is substantially equal to that of their bases. However, the impedance driving the emitters to such potential is merely the back resistance of the emitter-base junctions which, while much smaller than the back impedance of diodes 28 and 29, is nevertheless fairly large. For example, when transistor 22 changes from a conductive to a non-conductive condition its base drops in potential by 1 volt. We may assume that the capacitance of the emitter-base junction of the transistor is substantially equal to that of diode 29. Accordingly, these two capacitors act as a two-to-one voltage divider so that the instantaneous decrease in the potential of the emitter of transistor 22 is only ½ volt. Thus diode 29 and the emitter-base junction of transistor 22 are both backwardly biased by ½ volt. The potential at the emitter of transistor 22 then changes exponentially to that existing at its base by virtue of the discharge of the capacitances of diode 29 and the emitter-base junction of transistor 22 by the reverse leakage current of the emitter-base junction of transistor 22. The time-constant of this discharge may be fairly large compared with the period of the square wave input; and an appreciable time may be required before the reverse bias of diode 29 reaches its proper value.

In FIGURE 2 when transistor 22*a* is rendered non-conductive, diode 26 is backradly biased by 1 volt so that the cut-off collector current of transistor 22*a* is by-passed to ground through diode 30 rather than flowing into the isolation transformer base drive circuit and then through conductor 87 to measuring resistor 35. The other terminal of secondary winding 60*a* is connected to a corresponding base drive circuit for an additional silicon planar transistor (21*a*) which replaces transistor 21. The anode of Zener diode 81*d* is also connected to the anode of a corresponding direct-current restoration rectifier associated with the base drive circuit of the second silicon planar transistor which replaces transistor 21.

It will be appreciated that a similar direct-current restoration circuit may be used for driving the bases of transistors 19 and 20 through an isolation transformer so that slight inequalities in the base drive of such transistors require no corresponding correction from differential amplifier 36.

It will be further appreciated that the assumption, for purposes of explanation, of substantially no forward voltage drop across diodes 23 through 32 and transistors 19 through 22 is not strictly correct. In practice silicon diodes and silicon transistors have a forward drop of approximately one-half volt, which may necessitate slight changes in voltage levels from those specified, as will be appreciated by those ordinarily skilled in the art.

It will be seen that I have accomplished the objects of my invention. The flow of current through the load resistor is maintained constant irrespective of variations in the saturation resistance and the voltage drop of a conductive gate transistor. The cut-off collector current of a non-conductive gate transistor is by-passed to ground and can not flow through the load resistor.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A switching circuit including in combination a first and a second transistor of one conductivity type, a third and a fourth transistor of the oppositive conductivity type, each transistor having an emitter and a collector, a first and a second and a third and a fourth and a fifth and a sixth unilateral impedance each having a high back resistance, means connecting the four transistors in a bridge circuit having a first and a second input terminal and a first and a second output terminal, the emitters of the first and second transistors being connected to the first input terminal, the emitters of the third and fourth transistors being coupled to the second input terminal, the collectors of the third and fourth transistors being connected to the respective first and second output terminals, the collectors of the first and second transistors being coupled through the respective first and second impedances to the respective first and second output terminals, a load, means connecting the load between the output terminals, a resistor, means connecting the resistor to the second input terminal, a constant-current source, means connecting the source to the first input terminal, means including a transformer and the third and fourth impedances for selectively rendering the third and fourth transistors conductive, means including the fifth and sixth impedances for selectively rendering the third and fourth transistors nonconductive, means selectively rendering conductive and nonconductive the respective first and second transistors in synchronism with the respective fourth and third transistors, and means responsive to the voltage across the resistor for controlling the output current of the source.

2. A switching circuit as in claim 1 further including means operable upon conduction of the first and fourth transistors for applying predetermined backward biases to the second and third and sixth impedances, and means operable upon conduction of the second and third transistors for applying predetermined backward biases to the first and fourth and fifth impedances, the third and fourth transistors each having an emitter-base junction exhibiting a high back resistance, and said means rendering the third and fourth transistors nonconductive comprising means for applying predetermined backward biases to said junctions.

3. A switching circuit as in claim 1 further including a seventh and an eighth unilateral impedance each having a high back resistance, and in which the emitters of the third and fourth transistors are coupled through the respective seventh and eighth impedances to the second input terminal.

4. A switching circuit including in combination four gating devices, means connecting the gates in a bridge circuit having a pair of direct-current input terminals and a pair of alternating-current output terminals, means for selectively rendering opposing pairs of the bridge-connected gates conductive and nonconductive, a load, means connecting the load between the output terminals, a constant-current source, a resistor, means connecting the resistor in series with the input terminals to form a series circuit, means applying the source to the series circuit, and means responsive to the voltage across the resistor for controlling the output current of the source.

5. A switching circuit including in combination a transistor having a base and an emitter, a first source of direct-current potential, means coupling the first source to the emitter, a floating source of direct-current potential, a bistable flip-flop circuit providing an output, means including the floating source for exciting the flip-flop, a source of pulses, means responsive to the pulse source and comprising a transformer for triggering the flip-flop, and means applying the output of the flip-flop between the base and the emitter.

6. A switching circuit including in combination a transistor having a base and an emitter, a first signal source having a conductive connection with the emitter, means including a transformer for providing a floating signal source, a first and a second unilateral impedance each having an anode and a cathode, means connecting the anode of one impedance and the cathode of the other impedance to the base, means comprising the first source and the first impedance for selectively rendering the transistor nonconductive, and means comprising the floating source and the second impedance for selectively rendering the transistor conductive.

7. A switching circuit including in combination a transistor having a base, a first and a second unilateral impedance each having an anode and a cathode, means connecting the anode of one impedance and the cathode of the other impedance to the base, first means for selectively rendering the transistor conductive, and second means for selectively rendering the transistor nonconductive, the first means comprising means for forwardly biasing the first impedance and for applying a predetermined and constant backward bias to the second impedance, and the second means comprising means for forwardly biasing the second impedance and for applying said predetermined constant backward bias to the first impedance.

8. A switching circuit including in combination a transistor having a base and an emitter and an emitter-base junction, a first signal source having a conductive connection with the emitter, means including a transformer for providing a floating signal source, a first and a second unilateral impedance each having an anode and a cathode, means connecting the anode of one impedance and the cathode of the other impedance to the base, selective means comprising the floating source for forwardly biasing the first impedance and the junction and for backwardly biasing the second impedance, and selective means comprising the first source for forwardly biasing the second impedance and for backwardly biasing the first impedance and the junction.

9. A switching circuit including in combination a transistor having a base and an emitter-base junction, a first and a second unilateral impedance each having an anode and a cathode, means connecting the anode of one impedance and the cathode of the other impedance to the base, first means for selectively rendering the transistor conductive, and second means for selectively rendering the transistor nonconductive, the first means comprising means for forwardly biasing the first impedance and the junction and for applying a predetermined and constant backward bias to the second impedance, and the second means comprising means for forwardly biasing the second impedance and for applying said predetermined constant backward bias to the first impedance and to the junction.

10. A switching circuit including in combination a transistor having a base and an emitter, a source of square-wave voltage of variable mark-space ratio, a transformer having a primary and a secondary winding, means coupling the source to the primary winding, a capacitor, a direct-current restoration circuit comprising a rectifier in series with a Zener diode, means including the capacitor for connecting the secondary winding across the restoration circuit, and means connecting the restoration circuit between the base and the emitter.

11. A switching circuit including in combination a transistor having a base, a first and a second unilateral impedance each having an anode and a cathode, means connecting the anode of one impedance and the cathode of the other impedance to the base, said anode and said cathode comprising the sole connections to the base, first means for selectively rendering the transistor conductive, and second means for selectively rendering the transistor nonconductive, the first means comprising means for applying a continuous forward bias to the first impedance and for applying a predetermined constant backward bias to the second impedance, and the second means comprising means for applying a continuous forward bias to the second impedance and for applying a certain constant backward bias to the first impedance.

References Cited

UNITED STATES PATENTS

| | | | |
|---|---|---|---|
| 3,132,303 | 5/1964 | Rall | 307—282 |
| 3,235,751 | 2/1966 | Callan | 307—293 |

ARTHUR GAUSS, Primary Examiner

B. P. DAVIS, Assistant Examiner

U.S. Cl. X.R.

307—241, 260, 317